United States Patent
Yeh

(10) Patent No.: US 8,267,612 B2
(45) Date of Patent: Sep. 18, 2012

(54) HOLDING STRUCTURE FOR ROBOTIC ARM

(75) Inventor: Chi-Hsien Yeh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 597 days.

(21) Appl. No.: 12/236,520

(22) Filed: Sep. 24, 2008

(65) Prior Publication Data

US 2009/0226249 A1  Sep. 10, 2009

(30) Foreign Application Priority Data

Mar. 5, 2008 (CN) .......................... 2008 1 0300475

(51) Int. Cl.
*B25G 3/18* (2006.01)
(52) U.S. Cl. .................................... 403/322.2
(58) Field of Classification Search ............... 403/322.1, 403/322.2, 31, 36, 38, 39
See application file for complete search history.

(56) References Cited

U.S. PATENT DOCUMENTS

| | | | | |
|---|---|---|---|---|
| 3,887,150 A | * | 6/1975 | Jakubowski, Jr. .......... 244/137.4 |
| 4,015,456 A | * | 4/1977 | Moberg ............................. 70/34 |
| 4,185,539 A | * | 1/1980 | Stratienko ........................... 91/45 |
| 4,619,188 A | * | 10/1986 | Kimura ............................... 92/26 |
| 5,415,066 A | | 5/1995 | Erickson et al. |
| 6,193,261 B1 | * | 2/2001 | Hahka ........................... 280/515 |
| 6,772,468 B1 | * | 8/2004 | Psik et al. ..................... 15/229.2 |
| 7,574,768 B2 | * | 8/2009 | Morris et al. .................... 15/145 |
| 7,963,717 B2 | * | 6/2011 | Seger .......................... 403/322.2 |
| 8,005,570 B2 | * | 8/2011 | Gloden et al. ................ 700/245 |
| 2011/0167969 A1 | * | 7/2011 | Erickson et al. ............... 82/160 |

FOREIGN PATENT DOCUMENTS

| | | |
|---|---|---|
| CN | 2214249 Y | 12/1995 |
| CN | 1411952 | 4/2003 |
| TW | 200720030 A | 6/2007 |

* cited by examiner

*Primary Examiner* — Michael P Ferguson
*Assistant Examiner* — Daniel Wiley
(74) *Attorney, Agent, or Firm* — Altis Law Group, Inc.

(57) ABSTRACT

An exemplary holding structure used for holding an object that defines a latching hole, includes a main body, a pressing member received in the main body, and two latching members. The main body includes a lodging portion for being lodged into the latching hole of object and two receiving holes are defined in the lodging portion. The latching members are received in the receiving holes. The pressing member is configured to press the latching members to partially extend out of the at least two receiving holes for holding the object. The pressing member is capable of disengaging from the at least two latching members for releasing the object from the lodging portion.

11 Claims, 4 Drawing Sheets

HOLDING STRUCTURE FOR ROBOTIC ARM

BACKGROUND

1. Technical Field

The present disclosure generally relates to holding structures, and particularly, to a holding structure for a robotic arm.

2. Description of the Related Art

Presently, robots are widespread in automatic production devices. A robotic arm is an important part of a robot. The robotic arm may include a holding structure for gripping an object, e.g., a workpiece. One such holding structure generally includes a plurality of gripping fingers mounted on a control rod. When the object needs to be gripped by the robotic arm, opening and closing movements of the gripping fingers are actuated by a drive module. However, the gripping fingers generally occupy a relatively large space. In addition, the drive module for actuating opening and closing movements of the gripping fingers is complex and further increases the weight and the volume of the holding structure.

Therefore, a new holding structure for a robotic arm is desired in order to overcome the above-described shortcomings.

SUMMARY

A holding structure used for holding an object that defines a latching hole, includes a main body, a pressing member received in the main body, and two latching members. The main body includes a lodging portion for being lodged into the latching hole of object and two receiving holes are defined in the lodging portion. The latching members are received in the receiving holes. The pressing member is configured to press the latching members to partially extend out of the two receiving holes for holding the object. The pressing member is capable of disengaging from the two latching members for releasing the object from the lodging portion.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present holding structure for a robotic arm. Moreover, in the drawings, like reference numerals designate corresponding parts throughout the several views.

DETAILED DESCRIPTION

Figure 1:
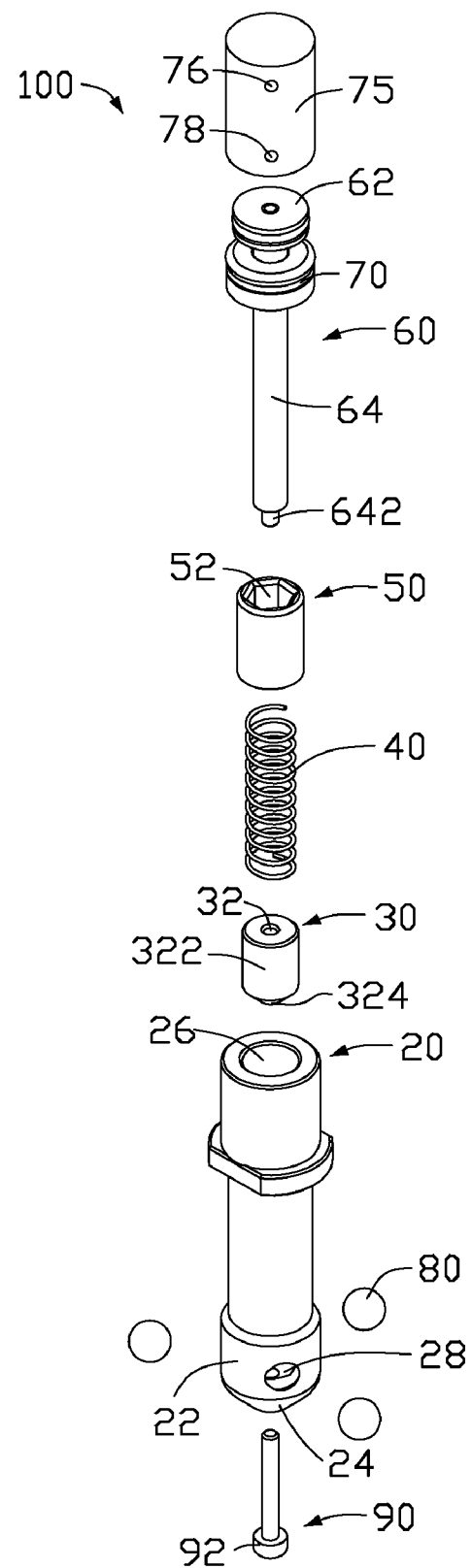
FIG. 1 is a partially exploded, isometric view of an embodiment of a holding structure for a robotic arm.

Referring to FIG. 1, one embodiment of a holding structure 100 for a robotic arm, includes a main body 20, a pressing member 30, a resilient member 40, a fastening member 50, a cylinder shaft 60, a seal lid 70, a cylinder body 75, three latching members 80, and a fixing member 90. The cylinder shaft 60, the seal lid 70, and the cylinder body 75 cooperatively form a pneumatic cylinder. The cylinder body 75 communicates with a pneumatic device (not shown) for receiving gas from the pneumatic device.

The main body 20 includes a lodging portion 22 adjacent to an end of the main body 20 and a conical portion 24 extending out from an end of the lodging portion 22. The main body 20 defines a stepped through hole 26 extending along an axis of the main body 20. A diameter of a portion of the through hole 26 in the conical portion 24 is smaller than the diameter of other portions of the through hole 26. The lodging portion 22 is shaped as a substantially hollow cylinder and defines three receiving holes 28 distributed evenly in a cylindrical side surface. The receiving holes 28 are circular holes communicating with the through hole 26, and are configured to receive the latching members 80.

The pressing member 30 includes a cylindrical portion 322, a pressing portion 324 formed at an end of the cylindrical portion 322, and a threaded hole 32 extending through the main portion and the pressing portion 324. The pressing member 30 is capable of sliding in the through hole 26 of the main body 20. The pressing portion 324 is shaped as a conical frustum-shaped portion for pressing the latching members 80 to move outwards. Furthermore, the latching member 80 may also press the pressing portion 324 to move upwards into the though hole 26 of the main body 20. In other words, a motion of the pressing member 30 and a motion of the latching member 80 can be changed by each other.

In one embodiment, the resilient member 40 may be a helical compression spring. It should be pointed that, the resilient member 40 may also be other springs such as a compression rubber spring.

The fastening member 50 is cylindrical in shape and defines a shaft hole 52. The fastening member 50 is configured to tightly engage in the through hole 26 of the main body 20.

The cylinder shaft 60 is configured to be partially received in the main body 20. The cylinder shaft 60 includes a piston 62 and a shaft portion 64. The piston 62 is fixed or formed on a first end of the shaft portion 64. A threaded portion 642 is formed at a second end of the shaft portion 64 away from the first end. The threaded portion 642 is configured to be screwed in the threaded hole 32 of the pressing member 32.

The cylinder body 75 is substantially a cylindrical barrel. The cylinder body 75 includes a closed end and an opened end opposite to the closed end. The cylinder body 75 defines a first gas valve 76 adjacent to the closed end and a second gas valve 78 adjacent to the opened end. The gas valves 76, 78 are configured to receive gas from the pneumatic device. The first end of the cylinder shaft 60 with the piston 62 are configured to be received in the cylinder body 75 and the opened end of the cylinder body 75 can be sealed by the seal lid 70.

The latching members 80 are rotatable balls. A diameter of each latching member 80 is slightly greater than a diameter of each receiving hole 28.

The fixing member 90 comprises a screw including a head portion 92 and a threaded portion (not labeled) extending from the head portion 92. The threaded portion of the fixing member 90 is configured to engage in the threaded hole 32 of the pressing member 30.

Figure 2:
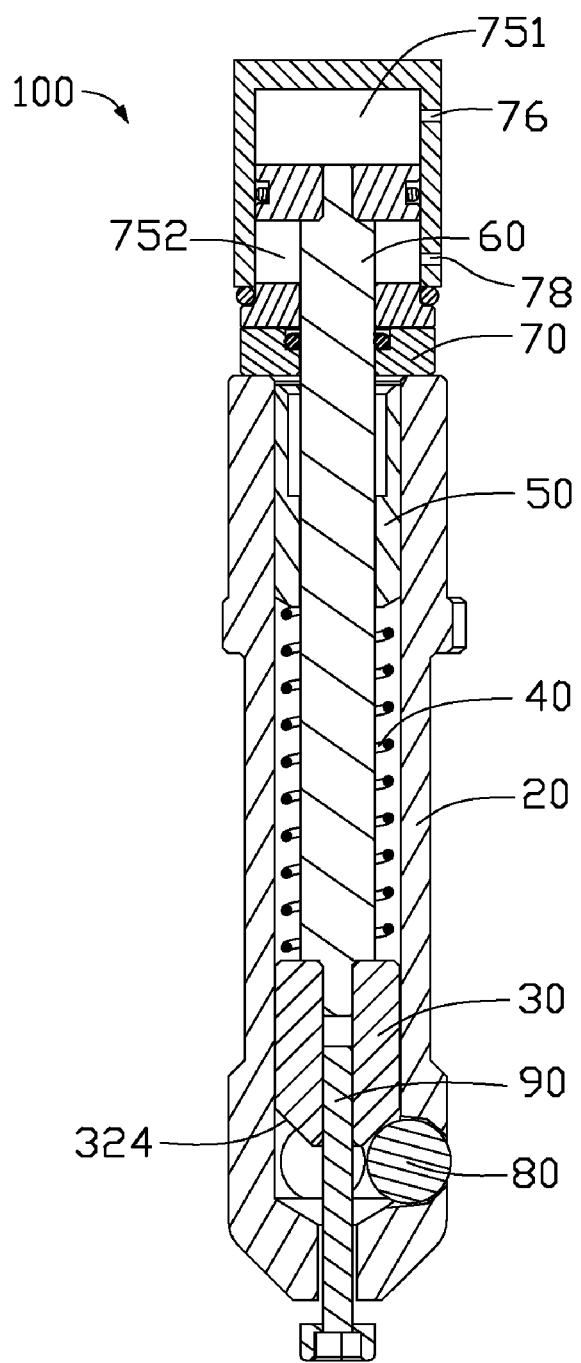
FIG. 2 is a cross-sectional view of the holding structure in FIG. 1

Referring to FIGS. 1 and 2 together, the holding structure 100 may be assembled as follows. The latching members 80 are inserted into the through holes 26 of the main body 20, and then received in the receiving holes 28 of the main body 20, correspondingly. The pressing member 30 is received in the through hole 26 of the main body 20 and presses the latching members 80 so that the latching members 80 partially extend out of the receiving holes 28 of the main body 20. The resilient member 40 is received in the through hole 26 of the main body 20 and abuts the pressing member 30. The fastening member 50 tightly engages in the through hole 26 of the main body 20 and abuts the resilient member 40. The shaft portion 64 of the cylinder shaft 60 is consecutively passed through the shaft hole 52 of the fastening member 50 and the resilient member 40. The threaded portion 642 of the cylinder shaft 60 is screwed in an upper portion of the threaded hole 32 of the pressing member 30, thus the cylinder shaft 60 is fixed relative to the pressing member 30. The threaded portion of the fixing member 90 is screwed in a lower portion of the threaded hole 32 of the pressing member 30. The first end of the cylinder shaft 60 together with the piston 62, are received in the cylinder body 75 and the opened end of the cylinder body 75 is sealed by the seal lid 70, thus the cylinder body 75 is partitioned into a first chamber 751 and a second chamber 752. The first gas valve 76 communicates with the first chamber 751 and the second gas valve 78 communicates with the second chamber 752.

Figure 3:
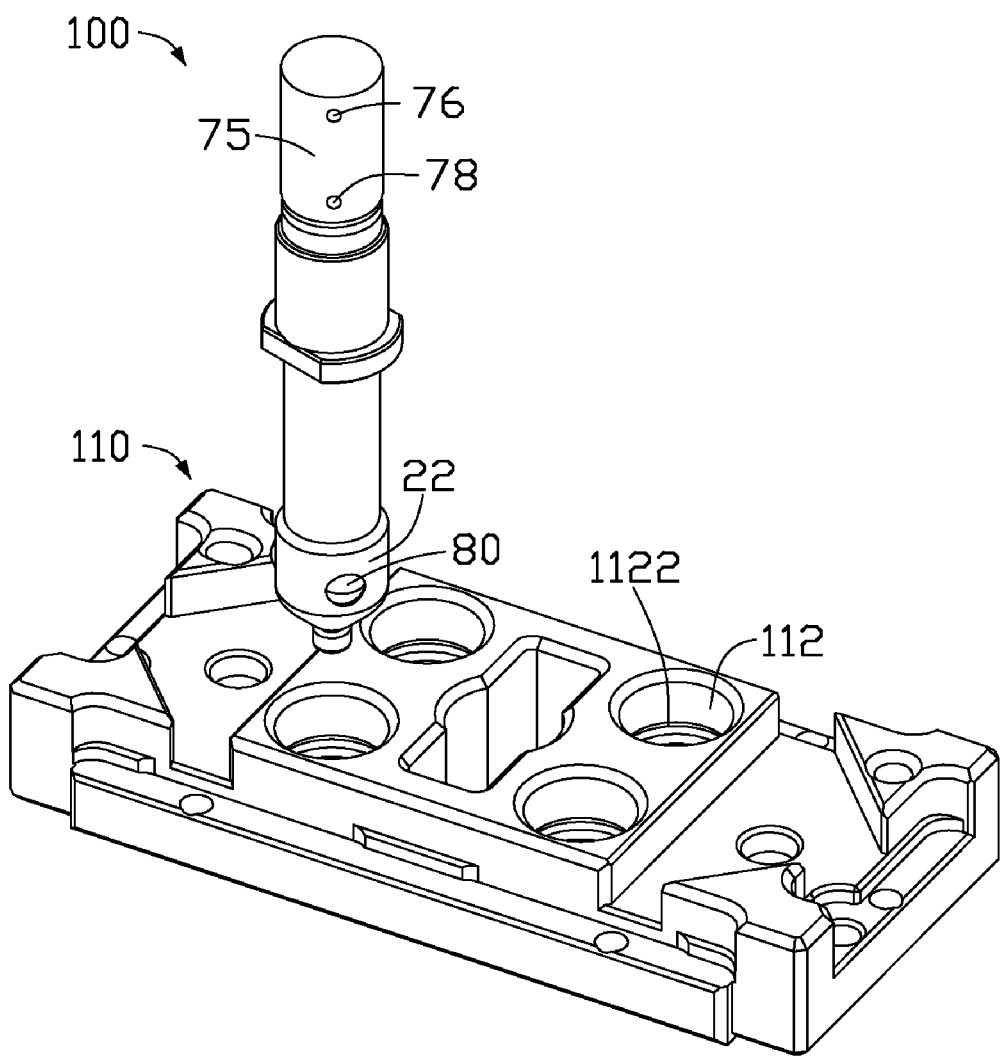
FIG. 3 is an assembled, isometric view of the holding structure in FIG. 1, and showing an object need to be held by the holding structure.
Figure 4:
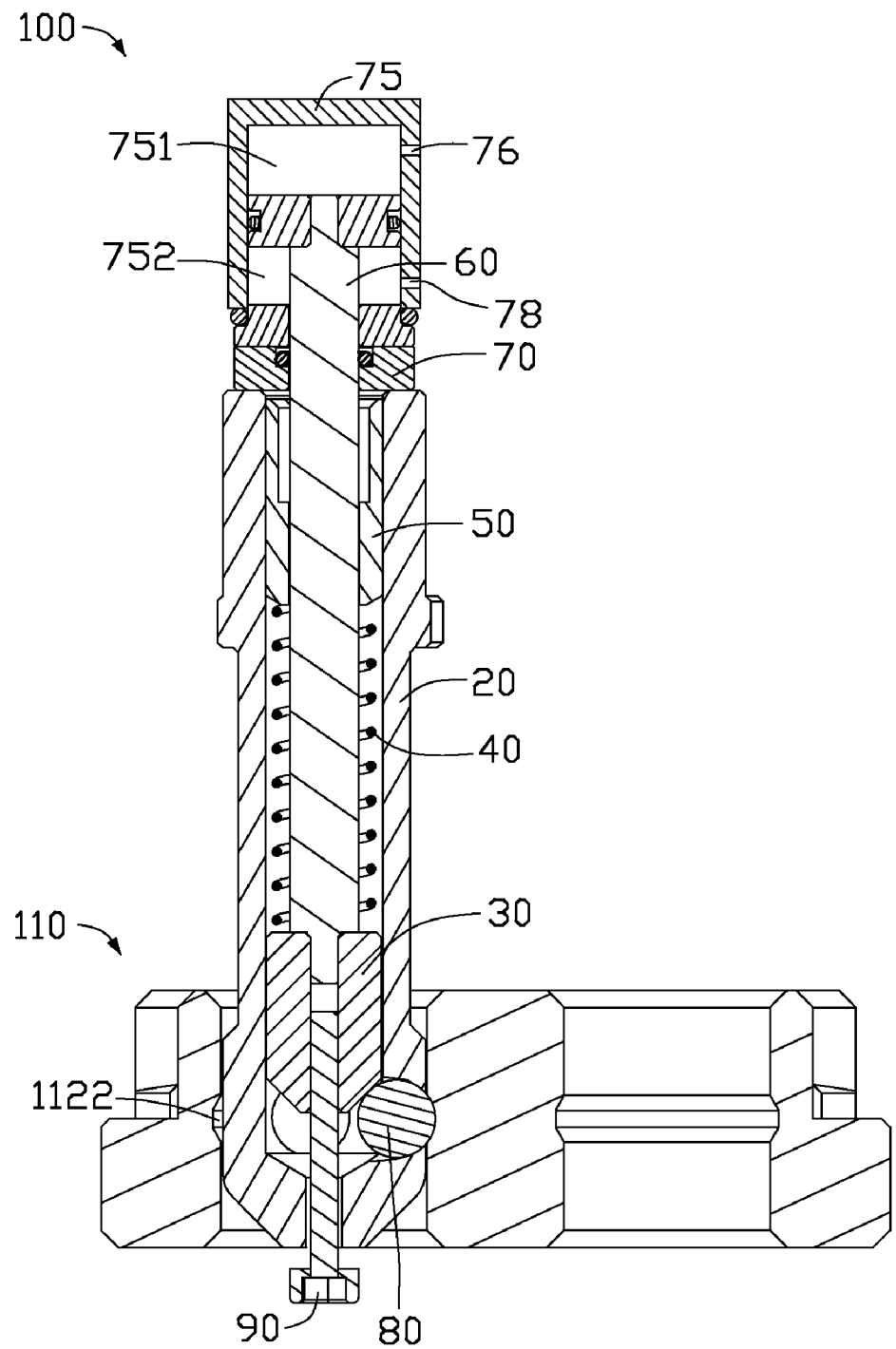
FIG. 4 is cross-sectional view of the holding structure with the object held by the holding structure.

Referring to FIG. 3, an object 110 needs to be held by the holding structure 100 defines a plurality of latching holes 112. A side wall in each latching hole 112 defining a latching groove 1122. Generally, two holding structures 100 are used for holding the object 110, and the number of the holding structures 100 may correspond to the number of the latching holes 112. The principle of using one of the holding structures 100 to hold the object 110 will be illustrated as follows.

When the object 110 is to be held by the holding structure 100, the lodging portion 22 of the main body 20 is aligned with one of the latching holes 112 of the object 110. At this time, the pressing member 30 presses the latching members 80, and the latching members 80 partially extend out of the receiving holes 28 of the main body 20. A pressure in the second chamber 752 is increased by injecting gas via the gas valve 78 or a pressure in the first chamber 751 is decreased by drawing the gas out of the first chamber 751 via the gas valve 76. The pressure in the first chamber 751 becomes lower than a pressure in the second chamber 752, thus a pressure difference is created between the first and second chambers 751, 752. The piston 62 with the shaft portion 64 is moved towards the closed end of the cylinder body 75 because of the pressure difference. The shaft portion 64 drives the pressing member 30 and the fixing member 90 to move towards the closed end of the cylinder body 75, thus compressing the resilient member 40 and, as a result, the pressing member 30 disengages with the latching members 80. The lodging portion 22 of the main body 20 is lodged into one of the latching holes 112 of the object 110.

When the lodging portion 22 of the main body 20 is lodged into the latching hole 112 of the object 110, the latching members 80 are drawn back into the receiving holes 28 of the main body 20 by the side wall of the latching hole 112. The lodging portion 22 of the main body 20 is moved until the latching members 80 reach the latching groove 1122. The pressure in the first chamber 751 is increased by injecting gas from the gas valve 78 or the pressure in the second chamber 752 is decreased by drawing gas out of the first chamber 751 via the gas valve 76, thus the pressure in the first chamber 751 becomes higher than the pressure in the second chamber 752. Then, the piston 62 with the shaft portion 64 is moved towards the opened end of the cylinder body 75. The shaft portion 64 drives the pressing member 30 and the fixing member 90 to move away from the closed end of the cylinder body 75, thus the latching members 80 are pushed by the pressing member 30 to partially extend out of the receiving holes 28 of the main body 20 and engage in the latching groove 1122. Therefore, the object 110 is held by the holding structure 100.

When the object 110 needs to be released from the holding structure 100, the pressure in the second chamber 752 is increased again by injecting gas from the gas valve 78 or a pressure in the first chamber 751 is decreased again by drawing gas out of the first chamber 751 via the gas valve 76. The shaft portion 64 with the pressing member 30 is moved to compress the resilient member 40 such that the pressing member 30 disengages with the latching members 80. When the holding structure 100 is moved away from the object 110, the latching members 80 are drawn back into the receiving holes 28 of the main body 20 and slide out of the latching groove 1122. Therefore, the object 110 is released from the holding structure 100.

In an alternative embodiment, the cylinder body 75 can be omitted, but the robotic arm defines a receiving chamber for receiving the cylinder shaft 60. When the cylinder shaft 60 is received in the receiving chamber, the receiving chamber is partitioned into two chambers. The cylinder shaft 60 can be moved upwards or downwards by injecting gas or drawn gas out of one of the first and second chambers 751, 752.

It should be pointed out that, the cylinder shaft 60 of the holding structure 100 may not connected to the cylinder body 75. When the lodging portion 22 of the main body 20 is inserted into the latching hole 112 of the object 110, the latching members 80 are drawn back into the receiving holes 28 of the main body 20 by the side wall of the latching hole 112 and press the pressing portion of the pressing member 30 to move upwards long the though hole 26 of the main body 20. The resilient member 40 is compressed by the pressing member 30. When the latching members 80 reach the latching groove 1122 of the object 110, the resilient member 40 creates a force to push the resilient pressing member 30 to move downwards, thus to press the latching members 80 to partially engage in the latching grooves 1122 of the object 110. Therefore, the object 110 is held by the holding structure 100. When the object 110 needs to be released from the holding structure 100, the head portion 92 is pushed to move upwards or the cylinder shaft 60 is pulled upwards. Therefore, the latching members 80 are drawn back into the receiving holes 28 of the main body 20 by the side wall of the latching hole 112 and slide out of the latching groove 1122 of the object 110. Then, the object 110 is released from the holding structure 100.

By controlling the latching members 80 to engage in or slide out of the latching groove 1122 of the object 110, the holding structure 100 can grasp and release the object 110. Therefore, the holding structure 100 occupies a relatively small space and has a relatively simple structure.

It should be pointed out that, the fixing member 90 may be omitted. The latching members 80 are not limited to rotatable spheres. Each latching member 80 may be shaped as a cylinder having a first spherical portion formed at a first end for abutting the pressing portion 324 of the pressing member 30 and a second spherical portion formed at an second end for engaging in the latching groove 1122 of the object 110. A number of the latching members may not be three, for example two or more than three.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the disclosure.

What is claimed is:

1. A holding structure comprising:
a main body comprising a lodging portion formed adjacent to a first end of the main body, and a conical portion extending from the lodging portion, the lodging portion defining at least two transverse receiving holes, the main body defining a stepped through hole extending from the conical portion of the main body to a second end of the main body opposite the first end and communicating with the at least two receiving holes, wherein a portion of the stepped through hole adjacent the conical portion has a first diameter smaller than the diameter of other portions of the stepped through hole;

a pressing member received in the stepped through hole of the main body adjacent the first end, the pressing member comprising a conical frustum-shaped pressing portion at an end thereof facing the conical portion;

at least two latching members received in the at least two receiving holes and disposed between the pressing portion of the pressing member and the conical portion of the main body;

a shaft partially received in the main body and fixed to the pressing member on a side thereof opposite the pressing portion;

a resilient member sleeved on the shaft and received in the main body abutting the pressing member;

a fastening member fixed to the second end of the main body and abutting the resilient member; and a fixing member partially inserted into the through hole of the main body through the conical portion and fixed to the pressing member adjacent the pressing portion, the fixing member comprising a head portion with a diameter larger than the first diameter positioned outside of the through hole;

wherein said holding structure is movable between a first configuration, in which the resilient member biases the pressing portion of the pressing member into the at least two latching members to partially extend the latch members out of the at least two receiving holes, and wherein the head portion of the fixing member is spaced from the conical portion, and a second configuration in which the pressing portion is disengaged from the latching members, and wherein the head portion contacts the conical portion, thereby preventing the pressing member being from locked within the main body.

2. The holding structure of claim 1, further comprising a cylinder body, wherein the shaft is a cylinder shaft and comprises a piston and a shaft portion, the piston is formed on a first end of the shaft portion, and the piston is received in the cylinder body to partition the cylinder body into two chambers.

3. The holding structure of claim 2, wherein the cylinder shaft further comprises a threaded portion formed at a second end of the shaft portion away from the first end, the pressing member defines a threaded hole, and the threaded portion is screwed in the threaded hole.

4. The holding structure of claim 1, wherein the resilient member is a compression spring.

5. The holding structure of claim 3, wherein the cylinder body is substantially a cylindrical barrel, and comprises a closed end and an opened end opposite to the closed end; the cylinder body defines a first gas valve adjacent to the closed end and a second gas valve adjacent to the opened end; the holding structure further comprises a seal lid sealed to the opened end of the cylinder body.

6. The holding structure of claim 5, wherein the pressing member, the resilient member, and the fastening member are consecutively received in the through hole.

7. The holding structure of claim 6, wherein the receiving holes are circular holes communicating with the through hole, the latching members are rotatable spheres, and a diameter of each of the latching members is greater than a diameter of each receiving hole.

8. A holding structure comprising:

a main body comprising a lodging portion formed at a first end thereof and a conical portion extending from the lodging portion, a stepped through hole extending from the conical portion of the main body to a second end of the main body opposite the first end, wherein the lodging portion defines three transverse receiving holes communicating with the through hole, wherein a portion of the stepped through hole adjacent the conical portion has a first diameter smaller than the diameter of other portions of the stepped through hole;

a pressing member received in the stepped through hole of the main body adjacent the first end, the pressing member comprising a conical frustum-shaped pressing portion at an end thereof facing the conical portion;

three latching members received in the receiving holes and disposed between the pressing portion of the pressing member and the conical portion of the main body;

a cylinder shaft partially received in the main body and fixed to the pressing member on a side thereof opposite the pressing portion;

a resilient member sleeved on the cylinder shaft and received in the main body abutting the pressing member;

a fastening member fixed to the second end of the main body and abutting the resilient member; and a fixing member partially inserted into received in the through hole of the main body through the conical portion and fixed to the pressing member adjacent the pressing portion, the fixing member comprising a head portion with a diameter larger than the first diameter positioned outside of the through hole;

wherein said holding structure is movable between a first configuration, in which the resilient member biases the pressing portion of the pressing member into the at least two latching members to partially extend the latch members out of the at least two receiving holes, and wherein the head portion of the fixing member is spaced from the conical portion, and a second configuration in which the pressing portion is disengaged from the latching members, and wherein the head portion contacts the conical portion, thereby preventing the pressing member from being locked within the main body.

9. The holding structure of claim 8, further comprising a cylinder body, wherein the cylinder shaft comprises a piston and a shaft portion, the piston is formed on an end of the shaft portion, and the piston is received in the cylinder body to partition the cylinder body into two chambers.

10. The holding structure of claim 9, wherein the cylinder body is substantially a cylindrical barrel, and comprises a closed end and an opened end opposite to the closed end; the cylinder body defines a first gas valve adjacent to the closed end and a second gas valve adjacent to the opened end; the holding structure further comprises a seal lid sealed to the opened end of the cylinder body.

11. The holding structure of claim 8, wherein the receiving holes are circular holes, the latching members are rotatable spheres, and a diameter of each of the latching members is greater than a diameter of each receiving hole.

* * * * *